United States Patent [19]
Mader et al.

[11] Patent Number: 5,663,874
[45] Date of Patent: Sep. 2, 1997

[54] MULTIPLE OUTPUT FLYBACK DC-TO-DC CONVERTER WITH SYNCHRONOUS RECTIFICATION AND CONSTANT ON-TIME CURRENT MODE CONTROL

[75] Inventors: Urs Harald Mader; Daryl Jay Sugasawara, both of San Jose; Joseph Brian Vanden Wymelenberg, Mountain View, all of Calif.

[73] Assignee: Micro Linear Corporation, San Jose, Calif.

[21] Appl. No.: 530,081

[22] Filed: Sep. 19, 1995

[51] Int. Cl.⁶ ................................................. H02M 3/335
[52] U.S. Cl. ............................. 363/21; 363/97; 363/131
[58] Field of Search ................................. 363/17, 20, 21, 363/56, 97, 131

[56] References Cited

U.S. PATENT DOCUMENTS

| | | | |
|---|---|---|---|
| 4,311,954 | 1/1982 | Capel | 323/222 |
| 4,456,872 | 6/1984 | Froeschle | 323/286 |
| 4,736,151 | 4/1988 | Dishner | 323/224 |
| 4,841,220 | 6/1989 | Tabisz et al. | 323/282 |
| 4,920,309 | 4/1990 | Szepesi | 323/269 |
| 4,929,882 | 5/1990 | Szepesi | 323/222 |
| 4,975,823 | 12/1990 | Rilly et al. | 363/56 |
| 5,412,308 | 5/1995 | Brown | 323/267 |
| 5,457,621 | 10/1995 | Munday et al. | 363/56 |
| 5,485,361 | 1/1996 | Sokal | 363/21 |

OTHER PUBLICATIONS

"ML4863 High Efficiency Flyback Controller", Micro Linear Corporation, Feb. 1995 1, 3, 5, 7 pages.
"ML4863EVAL User's Guide High Efficiency Flyback Controller", Micro Linear Corporation, Feb. 1995 pp. 1–5.
"Off–Line And One–Cell IC Converters Up Efficiency", Frank Goodenough, Electronic Design, pp. 55–56, 58, 60, 62–64, Jun. 27, 1994.
"Designing with hysteretic current–mode control", Gedaly Levin and Kieran O'Malley, Cherry Semi–Conductor Corp., EDN, pp. 95–96, 98, 100–102, Apr. 28, 1994.
"Analysis of the Flyback Converter Operating in Current–Mode Pulse–Frequency Modulation", Urs Mader and Kit Sum, High Frequency Power Conversion, Apr. 17, 1994 31 pages.
"Step–Up/Step Down Converters Power Small Portable Systems", Bruce D. Moore, EDN, pp. 79–85, Feb. 3, 1994.
"ML4861 Low Voltage Boost Regulator", Micro Linear Corporation, Jun. 1993 5 pages.

(List continued on next page.)

Primary Examiner—Peter S. Wong
Assistant Examiner—Adolf Berhane
Attorney, Agent, or Firm—Haverstock & Associates

[57] ABSTRACT

A multiple output flyback DC-to-DC converter with synchronous rectification and constant on-time current-mode control. A controller includes a constant on-time, minimum off-time oscillator that is coupled to control a gate of a first transistor which controls a current through a primary winding of a transformer having three secondary coupled inductors. Each of the three secondaries is coupled to a capacitor which is charged by each secondary current to an output voltage level which depends, in part, upon a ratio of windings. A transistor is coupled between each secondary winding and a resistive network. The gates of these transistors are coupled to be controlled by the controller for synchronous rectification. The resistive network monitors the secondary currents by generating a voltage signal that is representative of a weighted sum of the inductor currents. A difference between an output voltage level and a reference voltage level is added to the voltage signal generated by the resistive network for controlling the oscillator. When the voltage signal generated by the resistive network reaches a first predetermined level, the off-time of the oscillator is terminated and a new on-time is started, causing additional current to flow through the primary winding. When the output voltage level decreases, the first predetermined level is decreased. If the output voltage exceeds a second predetermined level, the controller enters a discontinuous mode whereby the oscillator halts until the output voltage drops below the second predetermined level.

32 Claims, 8 Drawing Sheets

OTHER PUBLICATIONS

"11. Variable Frequency Converters", K. Kit Sum, pp. 96–97, 134–135, 1993.

"Small–Signal High–Frequency Analysis Of The Free–Running Current–Mode–Controlled Converter", Richard Redl, pp. 897–906, IEEE, 1991.

MULTIPLE OUTPUT FLYBACK DC-TO-DC CONVERTER WITH SYNCHRONOUS RECTIFICATION AND CONSTANT ON-TIME CURRENT MODE CONTROL

FIELD OF THE INVENTION

This invention relates to the field of multiple output DC-to-DC converters. More particularly, this invention relates to multiple output DC-to-DC converters having synchronous rectification and/or constant on-time current-mode control.

BACKGROUND OF THE INVENTION

A prior art multiple output DC-to-DC converter is shown in FIG. 1. A voltage source VIN is coupled to a first terminal of a transformer primary winding L1, designated with a "dot," and coupled to deliver power to an integrated circuit chip controller 1. A second terminal of the primary winding L1 is coupled to a drain of an NMOSFET Q1. A source of the transistor Q1 is coupled to a first terminal of a resistor R1 and is coupled to deliver a current sensing voltage signal SENSE to the controller 1. A second terminal of the resistor R1 is coupled to a ground node. A gate of the transistor Q1 is coupled to be controlled by the controller 1 by a control signal OUT. A first terminal of a transformer secondary winding L2, designated with a dot, is coupled to the ground node. A second terminal of the secondary winding L2 is coupled to a first terminal of a transformer secondary winding L4, designated with a dot, and is coupled to an anode of a diode D1.

A cathode of the diode D1 is coupled to a first terminal of a capacitor C2, to a first terminal of a resistor R4 and to an input terminal to a low drop out regulator LDO1. A second terminal of the resistor R4 is coupled to the ground node. A second terminal of the capacitor C2 is coupled to the ground node. A ground terminal of the low drop out regulator LDO1 is coupled to the ground node. An output terminal of the low drop out regulator LDO1 is coupled to a first terminal of a capacitor C5 and coupled to an output voltage node VOUT3 (typically 3.3 volts). A second terminal of the capacitor C5 is coupled to the ground node.

A second terminal of the secondary winding L4 is coupled to a first terminal of a transformer secondary winding L3, designated with a dot, and coupled to an anode of a diode D3. A cathode of the diode D3 is coupled to a first terminal of a capacitor C4, to a first terminal of a resistor R3, to a first terminal of a capacitor C1, to deliver a voltage feedback signal FB to the controller 1 and coupled to an output voltage node VOUT1 (typically 5.0 volts). A second terminal of the capacitor C4 is coupled to the ground node. A second terminal of the resistor R3 is coupled to the ground node. A second terminal of the capacitor C1 is coupled to a first terminal of a resistor R2. A second terminal of the resistor R2 is coupled to deliver a compensation signal COMP to the controller 1. A second terminal of the secondary winding L3 is coupled to an anode of a diode D2. A cathode of the diode D2 is coupled to a first terminal of a capacitor C3, to a first terminal of a resistor R5 and to an input terminal to a low drop out regulator, LDO2.

A second terminal of the capacitor C3 is coupled to the ground node. A second terminal of the resistor R5 is coupled to the ground node. A ground terminal of the low drop out regulator LDO2 is coupled to the ground node. An output terminal of the low drop out regulator LDO2 is coupled to a first terminal of a capacitor C6 and to an output voltage node VOUT2 (typically 12.0 volts). A second terminal of the capacitor C6 is coupled to the ground node. A ground terminal of the controller 1 is coupled to the ground node.

The controller 1 is coupled to deliver the control signal OUT which controls the state of Q1 by controlling the voltage level at the gate of Q1. When Q1 is on, a current flows from VIN through L1, through Q1 and through R1 to the ground node. The signal SENSE is an input to the controller 1 for sensing the current level through Q1 and L1 by monitoring the voltage across R1. A coupled inductor comprises a primary winding L1 and secondary windings L2, L3 and L4.

Unlike a conventional transformer, the coupled inductor conducts current in either the primary or secondary windings, but not both simultaneously. The primary winding L1 is inductively coupled to each of the secondary windings L2, L3 and L4, such that when L1 is turned off by Q1, the energy stored in the inductor core is transferred to L2, L3 and L4. The polarity of the windings as shown in FIG. 1 use the "dot" convention wherein a current entering the terminal of L1 that is designated with a dot will induce a current to flow into the terminals of the secondary windings designated with dots when Q1 is turned off.

The currents induced in L2, L3 and L4 charge the capacitors C2, C3 and C4 through the diodes D1, D2 and D3 to a voltage level which depends, in part, upon the ratios of the number of windings that comprise each of L1, L2, L3 and L4 and upon the current through L1. The voltage across C4 is fed back to the controller through the feedback signal FB so that the controller may control the gate voltage of Q1 for maintaining VOUT1 at a constant voltage level (typically 5 volts). A low drop out linear regulator LDO1 is coupled to the capacitor C2 for forming the output voltage at VOUT3 (typically 3.3 volts). A low drop out linear regulator LDO2 is coupled to the capacitor C3 for forming the output voltage at VOUT2 (typically 12 volts).

Each of the terminals VOUT1, VOUT2 and VOUT3 may be coupled to power a load. However, the low drop out linear regulators LDO1 and LDO2 are required because when no load is coupled to either VOUT2 or VOUT3, the voltage level across the capacitors C2 or C3 would tend to rise or "pump up" due to leakage inductance of the inductors L2 and L3. Eventually, the output voltage would rise to a level that could cause device damage. Resistors R4 and R5 provide a minimum load that limits the voltage to which C2 and C3 could be pumped up were a load not present on VOUT2 or VOUT3. R4 and R5 are often necessary to avoid damage to LDO1 and LDO2, but they severely limit the system efficiency at light loads.

The low drop out voltage regulators LDO1 and LDO2 have the disadvantages of increasing the complexity of the system and limiting the efficiency of the system. In addition, such a system has the disadvantages of requiring the use of compensation components R2, R3 and C1 for maintaining stability in the feedback loop, and being unable to operate in a low power mode due to the need for the low drop out regulators, further limiting overall efficiency. Examples of circuits bearing resemblance to the one described above can be found in Linear Technology's Application Note 30, in FIG. 85, on page 42.

Yet another scheme is disclosed in a paper by Bruce D. Moore of Maxim Integrated Products, entitled "System-Engineered Portable Power Supplies Marry Improved Efficiency and Lower Cost." In this scheme, a secondary winding is inductively coupled to a filter inductor of a buck regulator. This secondary winding functions as a transformer secondary winding to generate a loosely regulated voltage source. This voltage source is then regulated by dual linear regulators which suffer from many of the disadvantages outlined above.

In addition, other types of converters are known such as variable switching frequency converters which employ a constant off-time or hysteresis. Constant off-time converters terminate the charge cycle when a particular inductor current level is achieved and the off-time is the same for each cycle. Hysteretic converters use the inductor current to terminate both the charge and the discharge cycles.

Also, the prior art includes various other multiple output DC-to-DC converter topologies wherein additional output voltages are generated by connecting a tapped inductor across the regulated outputs during the discharge phase of the switching cycle.

In addition, an example of a converter having constant on-time is part number MAX756/MAX757 made by Maxim Integrated Products. However, this implementation does not feed back the inductor current signal during normal operation. Only the output voltage is fed back making this a "constant on-time voltage mode control" converter. This makes the converter operation less stable and less predictable than desired.

What is needed is a multiple output DC-to-DC converter which overcomes the above described disadvantages.

SUMMARY OF THE INVENTION

The present invention is a multiple output flyback DC-to-DC converter with synchronous rectification and constant on-time current-mode control. A controller includes a constant on-time, minimum off-time oscillator that is coupled to control a gate of a first transistor which controls a current through a primary winding of a transformer having three secondary windings (sometimes referred to as "coupled inductors"). Each of the three secondary windings is coupled to a capacitor which is charged by each secondary current to an output voltage level which depends, in part, upon a ratio of windings between each secondary winding and the primary winding.

A transistor is coupled between each secondary winding and a resistive network. The gate of each of these transistors is coupled to be controlled by the controller for synchronous rectification. The resistive network monitors the secondary currents by generating a voltage signal that is representative of a weighted sum of the inductor currents.

A difference between an output voltage level and a reference voltage level is added to the voltage signal generated by the resistive network in response to the secondary currents for controlling the constant on-time, minimum off-time oscillator. When the voltage signal generated by the resistive network reaches a first predetermined level, the off-time of the constant on-time, minimum off-time oscillator is terminated and a new on-time is started, causing additional current to flow through the primary winding. When the output voltage level changes, the first predetermined level is adjusted. If the output voltage exceeds a second predetermined level, the controller enters a discontinuous or burst mode whereby the constant on-time, minimum off-time oscillator waits until the output voltage drops below the second predetermined level.

The invention utilizes flyback topology with constant on-time control. The circuit determines the length of the off-time by waiting for the inductor current to drop to a level determined by the output voltage. Consequently, the current programming is unconventional because the valley of the current ripple is programmed instead of the peak. The controller automatically enters variable frequency discontinuous mode when the programmed current fails below zero. Constant on-time control, therefore, features a transition into and out of discontinuous mode which does not require additional circuitry. The current programming resistive network is also used to control the synchronous rectifier, which makes for a compact and efficient circuit.

Under heavy load conditions, the controller runs at its maximum frequency. Under light load conditions, the controller reduces its frequency which reduces switching losses. This is significant because in battery powered systems with standby states, it is not uncommon for load currents to vary by a ratio of 100 to 1.

The constant on-time current mode control employed by the present invention includes another feedback path which monitors inductor current in addition to the feedback path which monitors output voltage. This results in stability and transient response of the converter that is superior to converters having only an output voltage feedback path. Further, this additional inductor current feedback path provides the converter with a cycle-by-cycle current limit which protects the converter switches from damage during an overload condition.

A diode may be used as a rectifying element in the discharge path of the secondary inductors to block conduction during the charge period and to conduct during the discharge period. If the inductor current drops to zero during discharge, the diode will prevent further conduction until the next discharge period. This is considered to be discontinuous mode. In contrast, when the inductor current is continuously above zero, this is considered to be continuous mode operation.

However, such diodes as rectifying elements are often a limiting factor in converter efficiency due to the forward voltage drop, especially in battery powered systems. An embodiment of the present invention employs synchronous rectification with MOSFET transistors. This reduces the forward voltage drop and allows for improved cross-regulation of the converter outputs due to the ability of the MOSFET's to conduct current in both directions.

In battery powered systems, it is not uncommon for the converter to operate primarily in the discontinuous mode. This allows the switching and magnetic components to be operated at their optimal current levels for brief periods and then shut off for a large proportion of the time. Light load efficiency then becomes primarily dependent upon the mount of supply current dram during periods when the inductor current is zero.

The present invention achieves a high degree of efficiency without excessive complexity in manufacture which makes it economical to produce and operate. These features make the present invention well suited for applications having a battery power supply. Portable computing and communication devices are among the numerous possible applications for the present invention.

DETAILED DESCRIPTION OF THE PREFERRED EMBODIMENT

Figure 2:
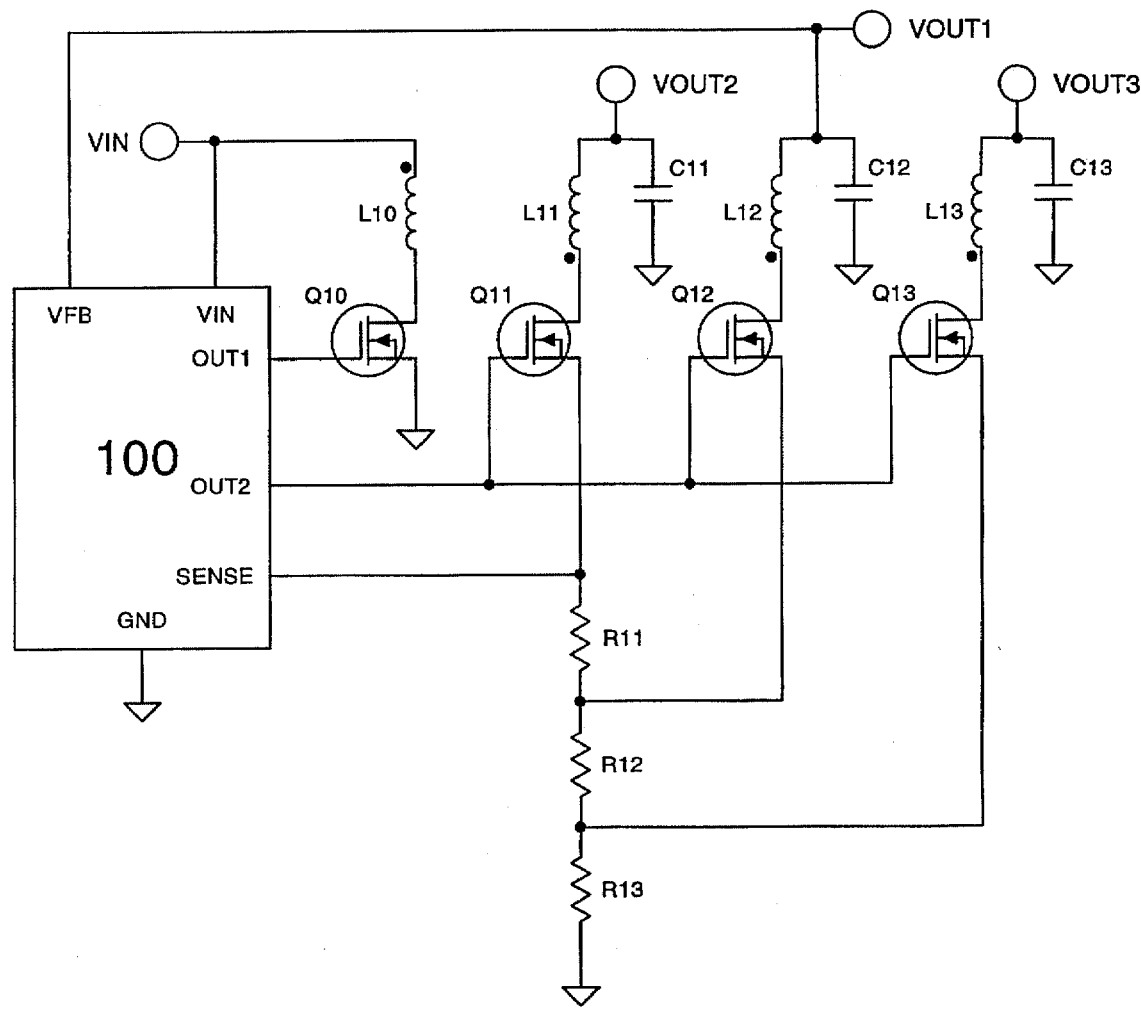
FIG. 2 shows a schematic diagram of a preferred embodiment of the present invention.

Referring to FIG. 2, a diagram of a preferred embodiment of the present invention is shown. A voltage source VIN is coupled to a first terminal of a primary transformer winding L10 and coupled to supply power to an integrated circuit chip controller 100. The first terminal of the transformer winding L10 is designated with a "dot" to show polarity of the primary transformer winding L10 with reference to secondary transformer windings to be discussed below. According to the "dot convention," current entering the primary transformer winding terminal designated with a dot will continue to flow into the dot in the secondary windings when Q10 is open.

A second terminal of the primary transformer winding L10 is coupled to a drain of an NMOSFET Q10. A source of the transistor Q10 is coupled to a ground node. A gate of the transistor Q10 is coupled to be controlled by the controller 100 by a signal designated OUT1. A gate of an NMOSFET Q11, a gate of an NMOSFET Q12 and a gate of an NMOSFET Q13 are all coupled to be controlled by the controller 100 by a signal designated OUT2. A drain of the transistor Q11 is coupled to a first terminal of a secondary transformer winding L11. The secondary transformer winding L11 is inductively coupled to the primary transformer winding L10. The first terminal of the secondary transformer winding L11 is designated with a dot with reference to the primary transformer winding L10. A second terminal of the secondary transformer winding L11 is coupled to a first terminal of a capacitor C11 and to an output voltage node VOUT2. A second terminal of the capacitor C11 is coupled to the ground node.

A drain of the transistor Q12 is coupled to a first terminal of a secondary transformer winding L12. The secondary transformer winding L12 is inductively coupled to the primary transformer winding L10. The first terminal of the secondary transformer winding L12 is designated with a dot with reference to the primary transformer winding L10. A second terminal of the secondary transformer winding L12 is coupled to a first terminal of a capacitor C12, to an output voltage node VOUT1 and to the controller 100 for providing a feedback voltage signal VFB to the controller 100 (VOUT1 is equivalent to VFB). A second terminal of the capacitor C12 is coupled to the ground node.

A drain of the transistor Q13 is coupled to a first terminal of a secondary transformer winding L13. The secondary transformer winding L13 is inductively coupled to the primary transformer winding L10. The first terminal of the secondary transformer winding L13 is designated with a dot with reference to the primary transformer winding L10. A second terminal of the secondary transformer winding L13 is coupled to a first terminal of a capacitor C13 and to an output voltage node VOUT3. A second terminal of the capacitor C13 is coupled to the ground node.

A source of the transistor Q11 is coupled to a first terminal of a resistor R11 and to the controller 100 for providing a current sensing voltage signal SENSE to the controller 100. A source of the transistor Q12 is coupled to a second terminal of the resistor R11 and to a first terminal of a resistor R12. A source of the transistor Q13 is coupled to a second terminal of the resistor R12 and to a first terminal of a resistor R13. A second terminal of the resistor R13 is coupled to the ground node.

Figure 3:
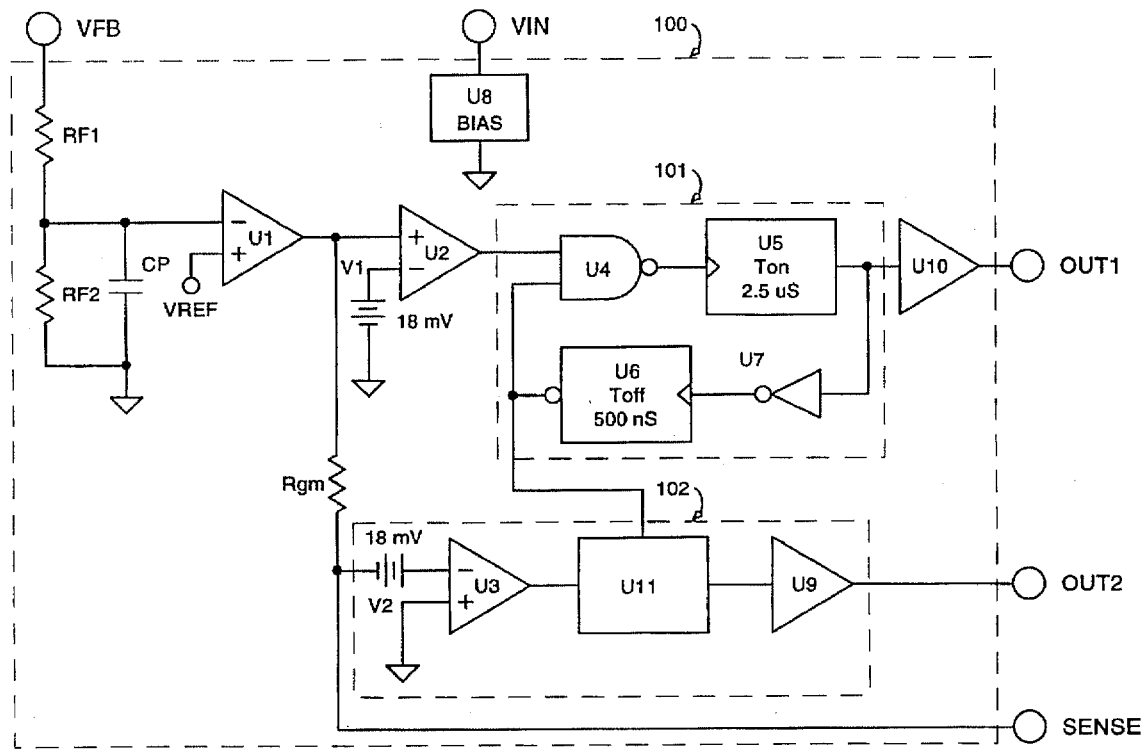
FIG. 3 shows a schematic diagram of the controller of the embodiment of the present invention shown in FIG. 2.

Referring now to FIG. 3, the controller 100 of FIG. 2 is shown in greater detail. The feedback voltage signal VFB from the circuit shown in FIG. 2 is coupled to a first terminal of a resistor RF1. A second terminal of the resistor RF1 is coupled to a first terminal of a capacitor CP, to a first terminal of a resistor RF2, and to an inverting input to a feedback transconductance amplifier U1. A second terminal of the capacitor CP is coupled to the ground node. A second terminal of the resistor RF2 is coupled to the ground node. A reference voltage level, VREF, is coupled to a non-inverting input to the feedback transconductance amplifier U1.

An output from the transconductance amplifier U1 is coupled to a first terminal of a resistor Rgm and to a non-inverting input to a current programming comparator U2. A positive terminal of a 18 mV voltage source V1 is coupled to the inverting input to the current programming comparator U2. A negative terminal of the 18 mV voltage source V1 is coupled to the ground node. A second terminal of the resistor Rgm is coupled to a negative terminal of a 18 mV voltage source V2 and coupled to receive the feedback voltage signal, SENSE from the circuit shown in FIG. 2. A positive terminal of the 18 mV voltage source is coupled to an inverting input to a rectifier comparator U3. A non-inverting input to the rectifier comparator U3 is coupled to the ground node.

An output from the current programming comparator U2 is coupled to a first input to an NAND gate U4. An output of the NAND gate U4 is coupled to an input to a one-shot circuit U5. Preferably, the one-shot circuit U5 has an on-time of 2.5 microseconds, but may have some other on-time. An output of the one-shot circuit U5 is coupled to an input to a gate driver U10 and coupled to an input to an inverter U7. An output of the gate driver U10 is coupled to provide the signal OUT1 to the circuit shown in FIG. 2.

An output of the inverter U7 is coupled to an input to a negating one-shot circuit U6. Preferably, the negating one-shot circuit U6 has an off-time of 500 nanoseconds, but may have some other off-time. An output from the negating one-shot circuit U6 is coupled to a second input to the NAND gate U4 and to a first input to a blanking circuit U11. The NAND gate U4, the one-shot circuit U5, the negating one-shot circuit U6 and the inverter U7 comprise a constant on-time, minimum off-time oscillator 101. An output of the rectifier comparator U3 is coupled to a second input to the blanking circuit U11. An output of the blanking circuit U11 is coupled to an input to a gate driver U9. Alternately, the blanking circuit could be removed and the output of the rectifier comparator U3 coupled to the input of the gate driver U9. An output from the gate driver U9 is coupled to supply the signal OUT2 to the circuit shown in FIG. 2. The voltage source V2, the rectifier comparator U3, the blanking circuit U11, and the gate driver U9 comprise a synchronous rectifier controller 102. A bias circuit U8 coupled to VIN supplies power to the active elements described above.

The controller 100 comprises four functional blocks: 1) the constant on-time, minimum off-time oscillator 101, 2)

the current programming comparator U2, 3) the feedback transconductance amplifier U1 and 4) the synchronous rectifier controller 102. In the preferred embodiment, the controller 100 is an integrated circuit chip, part number ML4863, obtained from Micro Linear Corporation, which is located at 2092 Concourse Drive, in San Jose, Calif. zip code 95131. However, it will be apparent that the controller 100 could also be constructed using other integrated circuits and/or discrete components.

Referring to FIG. 2 and FIG. 3, the feedback transconductance amplifier U1 generates an output current which is based upon a voltage difference between the feedback voltage VFB and the reference voltage VREF. The output current from the feedback transconductance amplifier U1 produces a voltage across Rgm. The voltage across Rgm produced by the output current from U1 adds to the negative feedback voltage SENSE at the non-inverting input to the current programming comparator U2 (therefore, the voltage across Rgm is compared to the negative of SENSE). The voltage signal SENSE is generally below ground level and is representative of a weighted sum of the currents through the inductors L11, L12 and L13.

The constant on-time, minimum off-time oscillator 101 has a constant on-time and a minimum off-time. The controller 100 determines the length of the off-time by waiting for the inductor currents through L11, L12 and L13 to drop to a predetermined level as monitored by the feedback voltage signal SENSE. The predetermined level is determined by the voltage across Rgm. During an off-cycle, when the negative voltage signal SENSE rises to the predetermined level (because the inductor currents decrease), the non-inverting input to the current programming comparator U2 becomes positive so that the output of U2 trips, terminating the off-cycle and starting a new on-cycle. The off-time is extended so long as the output of the current programming comparator U2 is low. Note that a minimum amount of off-time is required for the inductor currents (represented by the signal SENSE) to be sensed in order to account for time delays in sensing.

The on-cycle has a constant time period. During the on-time period, Q10 is turned on, Q11, Q12, and Q13 are turned off and current flows only through the inductor L10 which stores energy in the inductor core. During the off-time, Q10 is turned off, and Q11, Q12, and Q13 are turned on (so long as there is current flow from source to drain). As a result of this, the energy in the inductor core induces current to flow in the secondary windings L11, L12 and L13 which charges the capacitors C11, C12 and C13. The voltage across C11 is the output voltage VOUT2 (typically 12 volts). The voltage across C12 is the output voltage VOUT1 (typically 5.0 volts) and is fed back via the voltage signal VFB. The voltage across C13 is the output voltage VOUT3 (typically 3.3 volts).

If the output voltage VOUT1 drops due to an increase in a load coupled to VOUT1, the output current from the feedback transconductance amplifier U1 will be increased, which will produce a larger voltage across Rgm (adjusting the predetermined level). When the larger voltage across Rgm is added to the voltage SENSE at the non-inverting input to U2, the result is a higher trip level for the signal, SENSE (a more negative value for the voltage signal SENSE begins a new on-cycle).

If the output voltage VOUT1 exceeds a second predetermined value, determined by VREF (and the feedback and pole compensation components RF1, RF2 and Cp, as discussed below), the output from the feedback transconductance amplifier U1 goes to zero. The voltage signal SENSE will not become positive because the synchronous rectifier controller 102 prevents the inductor currents from going negative. Therefore; the non-inverting input to the comparator U2 will be zero and the 18 mV offset on its inverting input terminal prevents its output from going high. This causes the oscillator 101 to wait until the output voltage VOUT1 drops enough to cause the input to the current programming comparator U2 to become greater than 18 mV. Periods during which the output current of the feedback transconductance amplifier U1 goes to zero are referred to as periods of discontinuous operation of the DC-to-DC converter. During such discontinuous operation, the invention may supply low power at a high efficiency (a low power mode). Periods of time during which the output current of the feedback transconductance amplifier U1 causes more than 18 mV to be developed across Rgm are referred to as periods of continuous operation of the DC-to-DC converter.

The synchronous rectifier controller 102 is mined on, raising the level of the signal OUT2, during the minimum off-time of the constant on-time, minimum off-time oscillator 101, or whenever the voltage SENSE is less than approximately −18 mV. The output of the negating one-shot circuit U6 is coupled to an input of the blanking circuit U11 so that the minimum off-time controls the blanking function; the blanking circuit U1 forces the synchronous rectifier controller 102 on during the minimum off-time.

During transitions when the transistor Q10 is mined on after the voltage signal SENSE goes above approximately −18 mV, the input gate of the synchronous rectifier is discharged softly to avoid erroneously triggering the current programming comparator U2 with a gate discharge spike.

Figure 4:
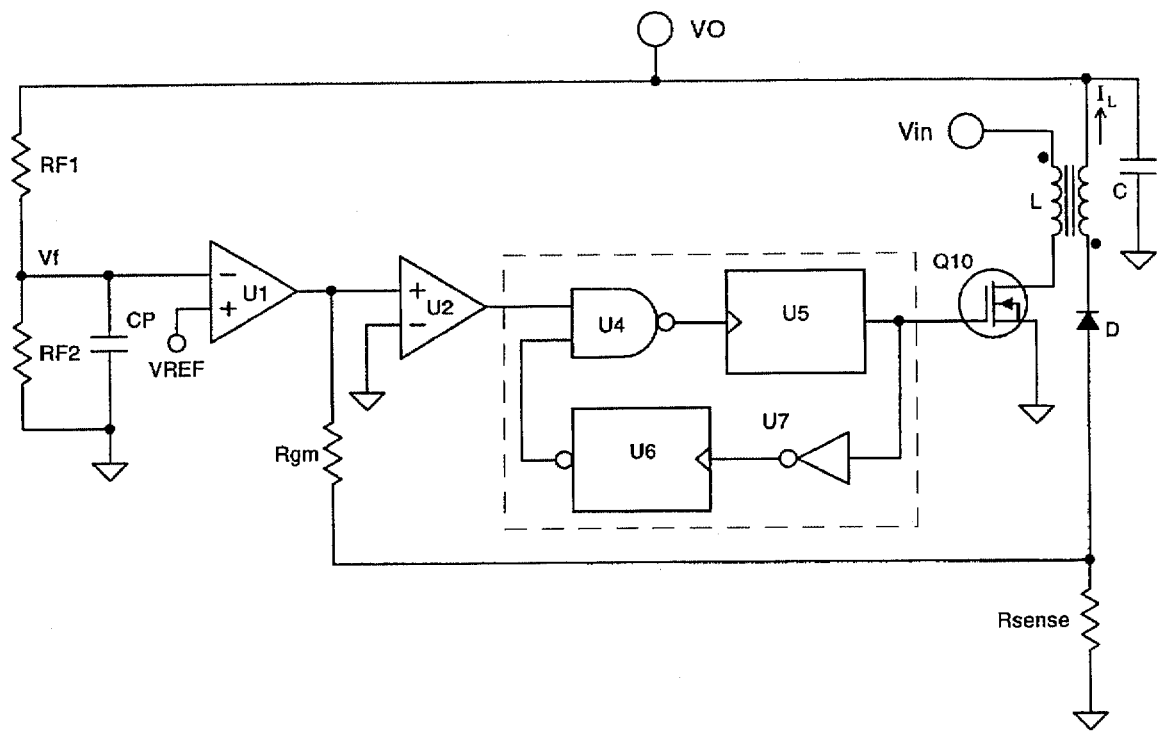
FIG. 4 shows a schematic diagram of an embodiment of the present invention having a single output node and no synchronous rectification.

It will be apparent that the synchronous rectifier controller 102 could be removed and each of the transistors Q11, Q12 and Q13 replaced with a diode (such a diode is shown in FIG. 4 designated D), however, system efficiency would suffer due to the forward voltage drop of the diode. This inefficiency would be especially disadvantageous in battery powered applications due to the limited charge capacity of a battery and the desire for longer operating periods between charges. Further, the forward voltage drop of the diode adds to any error in the output voltage at each of the auxiliary outputs. A diode would also have a tendency to pump parasitic switching energy into the output during switching transients which may cause an auxiliary output to float to a level that is higher than intended under light loads.

In contrast, synchronous rectification avoids these problems. Using MOSFET switches for each of the transistors Q11, Q12 and Q13 results in a minimal voltage drop and the ability to conduct current in both directions. Because the switches allow current to flow in both directions through each switch, the output voltages can equalize better (according to the ratio of rams between each secondary whig and the primary winding). Because diodes only allow current to flow into the outputs, energy transmitted to an output from the coupled inductor's leakage inductance at the end of the discharge phase can cause outputs with light loads to become "pumped up" to a voltage level much higher than that predicted by the inductor's turns ratio. Synchronous rectification avoids this problem by allowing any extra energy transferred by the leakage inductance to be removed in the following cycle because the charge is allowed to flow into the other, more heavily loaded outputs. The minimal forward voltage drop of the MOSFET's also helps to equalize the voltages of the outputs according to turns ratios of the coupled inductors.

Cross regulation refers to the influence of one output on the other outputs under various load conditions. Designing the above-described switches and windings of the magnetic circuit for low resistance will result in improved cross regulation among the multiple outputs.

It will be apparent after reading this disclosure that the synchronous rectification aspect of the invention could be practiced using other types of converters. For example, a buck regulator or a flyback regulator would receive the benefit of cross-regulation by employing the synchronous rectification aspect of the present invention.

Further, it will be apparent that the transistors Q11, Q12 and Q13 shown in FIG. 2 may be referred to as "rectifying elements" or "switches." For purposes of this disclosure, a rectifying element may be a FET, a bipolar transistor, a triac, a diode, a switch, a relay, or an SCR, but is preferably a MOSFET.

According to the above description, the DC-to-DC converter of the present invention employs two feedback loops: the current programming loop comprising the signal SENSE and the voltage feedback loop comprising the signal VFB. The current programming loop is relatively fast in that it acts on a cycle-by-cycle basis to regulate the valley of the ripple current of the secondary inductors. The voltage feedback loop is relatively slow because the output capacitor C12 integrates the output current of the inductor L12.

The DC-to-DC converter of the present invention automatically transitions between continuous operation and discontinuous operation as required by the circumstances. In the discontinuous mode, there is no concern for feedback stability because the DC-to-DC converter operates like a thermostat; a current pulse is sent to charge the output capacitors only when the output voltage has dropped. In the continuous mode, feedback stability is a concern; the output capacitor C12 has an effective series resistance which causes a zero in the feedback loop's dynamics. The capacitor CP in conjunction with the output resistance of the voltage divider RF1 and RF2 serve to stabilize the feedback loop by adding a pole to cancel the output capacitor's zero. This pole cancellation causes the gain of the loop to roll off as frequency increases so that the loop is stable over a wide range of operating conditions.

The circuit of FIG. 3 utilizes offset voltages of 18 mV to avoid having any negative voltage levels employed within the circuit. Including negative voltages in an integrated circuit can cause certain design complications. The circuit of FIG. 4 shows an implementation without any offset voltages.

FIG. 4 shows a simplified schematic diagram of an embodiment of the present invention. It will be apparent that the circuit shown in FIG. 4 is similar in operation and in topology as the circuit shown in FIG. 2 and FIG. 3 except that the synchronous rectifier controller has been removed, the rectifying element is a diode rather than a transistor, the current-mode comparator offset has been removed, and there is only one output voltage node.

In FIG. 4, a voltage source VIN is coupled to a first terminal of a primary winding of a transformer L. The first terminal of the primary winding of the transformer L is designated with a dot. A second terminal of the primary winding of the transformer L is coupled to a drain of an NMOS transistor Q10. A source of the transistor Q10 is coupled to the ground node. A first terminal of a secondary winding of the transformer L is designated with a dot and is coupled to a cathode of a diode D. An anode of the diode D is coupled to a first terminal of a resistor Rsense and to a first terminal of a resistor Rgm. A second terminal of the resistor Rsense is coupled to the ground node. A second terminal of the secondary winding of the transformer L is coupled to a first terminal of a capacitor C, to an output voltage node Vo and to a first terminal of a resistor RF1.

A second terminal of the capacitor C is coupled to the ground node. A second terminal of the resistor RF1 is coupled to a first terminal of a capacitor CP, to a first terminal of a resistor RF2, and to an inverting input to a feedback transconductance amplifier U1. A second terminal of the capacitor CP is coupled to the ground node. A second terminal of the resistor RF2 is coupled to the ground node. A non-inverting input to the feedback transconductance amplifier U1 is coupled to a reference voltage level VREF. An output from the feedback transconductance amplifier U1 is coupled to a second terminal of the resistor Rgm and to a non-inverting input to a current programming comparator U2. An inverting input to the current programming comparator U2 is coupled to the ground node. An output from the current programming comparator U2 is coupled to a first input to a NAND gate U4. An output from the NAND gate U4 is coupled to an input to a one-shot circuit U5. An output from the one-shot circuit U5 is coupled to a gate of the transistor Q10 and to an input to an inverter U7. An output from the inverter U7 is coupled to an input to a inverting one-shot circuit U6. An output from the inverting one-shot circuit U6 is coupled to a second input to the NAND gate U4.

Figure 5:
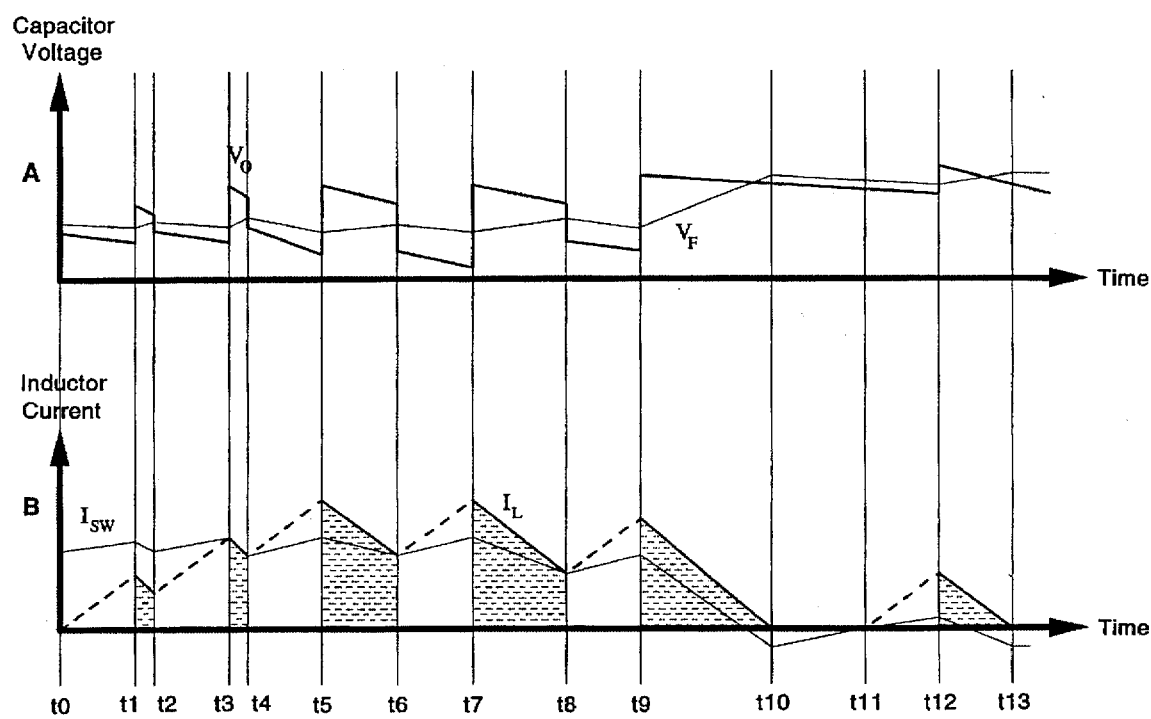
FIG. 5 shows a graphs of signal waveforms versus time for the circuit shown in FIG. 4.

FIG. 5 shows graphs of signal waveforms versus time for the circuit shown in FIG. 4. Vo in FIG. 5 is the voltage at node Vo in FIG. 4. Vf in FIG. 5 is the voltage at the inverting input to the feedback transconductance amplifier U1 in FIG. 4 scaled to match the voltage level at Vo. IL in FIG. 5 represents current in the coupled inductor L in FIG. 4. Solid lines represent secondary current in L; dashed lines represent primary current. (The voltage across Rsense is substantially proportional to current in the secondary.) ISW in FIG. 5 is the current switch level; the level of IL which will cause U2 to change output states. ISW depends upon the output current level of the transconductance amplifier U1.

During the time period t0–t1, a constant on-time period, Q10 is on and IL ramps up. During the time period t1–t2, the inductor current IL is lower than is required to cause U2 to change states (ISW) so the off-time is the minimum required to sense the inductor current IL; the inductor current IL ramps down while Q10 is off, During the time period t2–t3, a constant on-time period, Q10 is on and the inductor current IL continues to ramp up. During the time period t3–t4, the inductor current IL continues to be lower than is required to cause U2 to change states (ISW) so the off-time is the minimum required to sense the inductor current IL; the inductor current IL ramps down while Q10 is off. During the time period t4–t5, a constant on-time period, Q10 is on and the inductor current IL ramps up. During the time period t5–t6, the inductor current IL is high enough to cause U2 to change states (higher than ISW) so the off-time is extended causing the inductor current to ramp down until U2 switches back again (IL=ISW). During the time period t6–t7, a constant on-time period, Q10 is on and the inductor current IL ramps up. During the time period t7–t8, the inductor current IL is again high enough to cause U2 to change states (higher than ISW) so the off-time is extended causing the inductor current IL to ramp down until U2 switches back again (IL=ISW). During the time period t8–t9, a constant on-time period, Q10 is on and the inductor current IL ramps up. During the time period t9–t10, the inductor current IL is again high enough to cause U2 to change states (higher than ISW) so the off-time is extended causing the inductor current L to ramp down; however, Vf now causes the output of U1 to become negative so that ISW becomes negative (IL cannot become negative due to the diode D). During the time period t10–t11, ISW is negative which causes the DC-to-DC converter to transit into the discontinuous mode, marked by time periods wherein ISW is negative and wherein the constant on-time, minimum off-time oscillator 101 halts until ISW becomes positive again. During the time period t11–t12, the DC-to-DC converter remains in the discontinuous mode; however, the constant on-time, minimum off-time oscillator 101 cycles once when ISW goes positive, entering a constant on-time period so that the inductor current IL ramps up. During the time period t12–t13, the inductor current IL is again high enough to cause U2 to change states (higher than ISW) so the off-time is extended causing the inductor current IL to ramp down; however, Vf now causes the output of U1 to become negative so that ISW becomes negative.

It will be apparent from FIG. 5 and the description thereof, that the invention has a variable operating frequency and that during the time period t0–t10 the invention is operating in the continuous mode and that during the time period t10–t13, the invention is operating in the discontinuous mode. Note that during continuous mode operation, the current valley of the current ripple is programmed rather than the peak. It will be apparent that the above described graph of signal wave forms is substantially applicable to other embodiments of the present invention described herein.

In FIG. 2, only the output voltage at the node VOUT1 is coupled to provide the feedback voltage VFB to the controller 100. This allows for a more precisely regulated voltage at the node VOUT1, while having less precisely regulated output voltages at the nodes VOUT2 and VOUT3. Other feedback schemes could be used, however, to generate the feedback voltage VFB.

Figure 6:
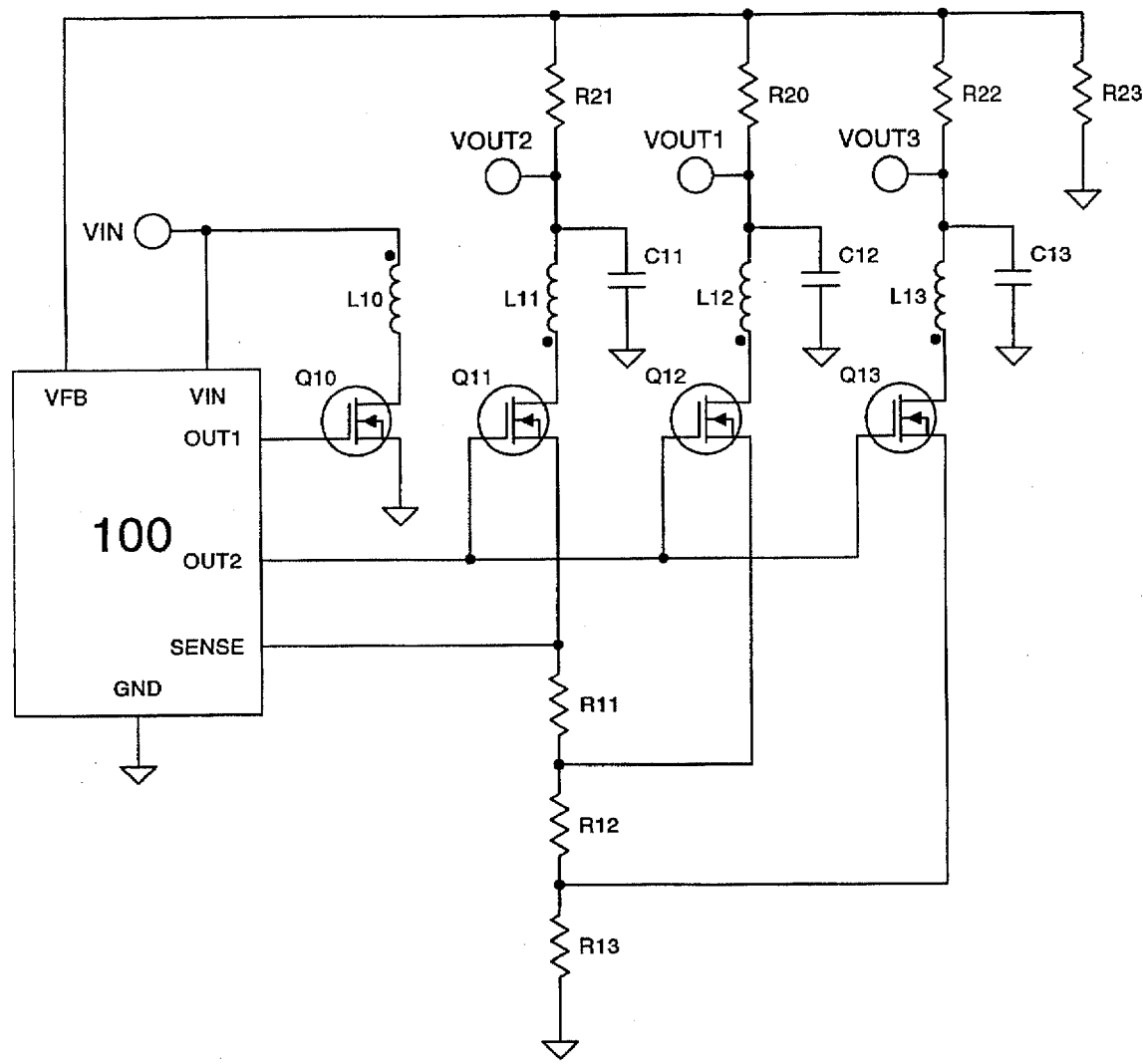
FIG. 6 shows a schematic diagram of an embodiment of the present invention having an alternate feedback network for generating the feedback voltage signal VFB.

For example, FIG. 6 shows a Schematic diagram of an alternate feedback network for generating the feedback voltage VFB. The circuit shown in FIG. 6 is the same as the circuit shown in FIG. 2 except that; the node VOUT1 is coupled to a first terminal of a resistor R20; the node VOUT2 is coupled to a first terminal of a resistor R21; the node VOUT3 is coupled to a first terminal of a resistor R22; a second terminal of the resistor R20 is coupled to a second terminal of the resistor R21, to a second terminal of the resistor R22, to a first terminal of a resistor R23 and coupled to provide the feedback signal VFB to the controller 100; and a second terminal of the resistor R23 is coupled to the ground node.

The above described feedbrick network does not include the conductor which couples the node VOUT1 to VFB as shown in FIG. 2. The network shown in FIG. 6 couples a voltage that is representative of an average value of the voltages at each of the nodes VOUT1, VOUT2 and VOUT3 to the controller 100 via the feedback signal VFB. The result is that no single output voltage is the most closely regulated output, but each output voltage contributes to the feedback voltage VFB.

In yet another alternate embodiment, a logic circuit may replace the averaging circuit shown in FIG. 6 so that the voltage VFB which is fed back to the controller 100 is the greatest of differences between each of the output voltages and its respective desired output voltage value. In this embodiment, rather than having only one output fed back as in FIG. 2, and rather than having an average value fed back as in FIG. 6, the output voltage which is the most different from its desired value will be fed back to the controller via the feedback signal VFB.

In FIG. 2 the resistors R11, R12, and R13 allow each of the windings L11, L12 and L13, of the transformer to be operated near saturation without the windings becoming saturated. This prevents the need to over-specify the saturation requirements of the transformer. However, the resistor network comprising the resistors R11, R12 and R13 could be replaced with other resistor networks.

Figure 7:
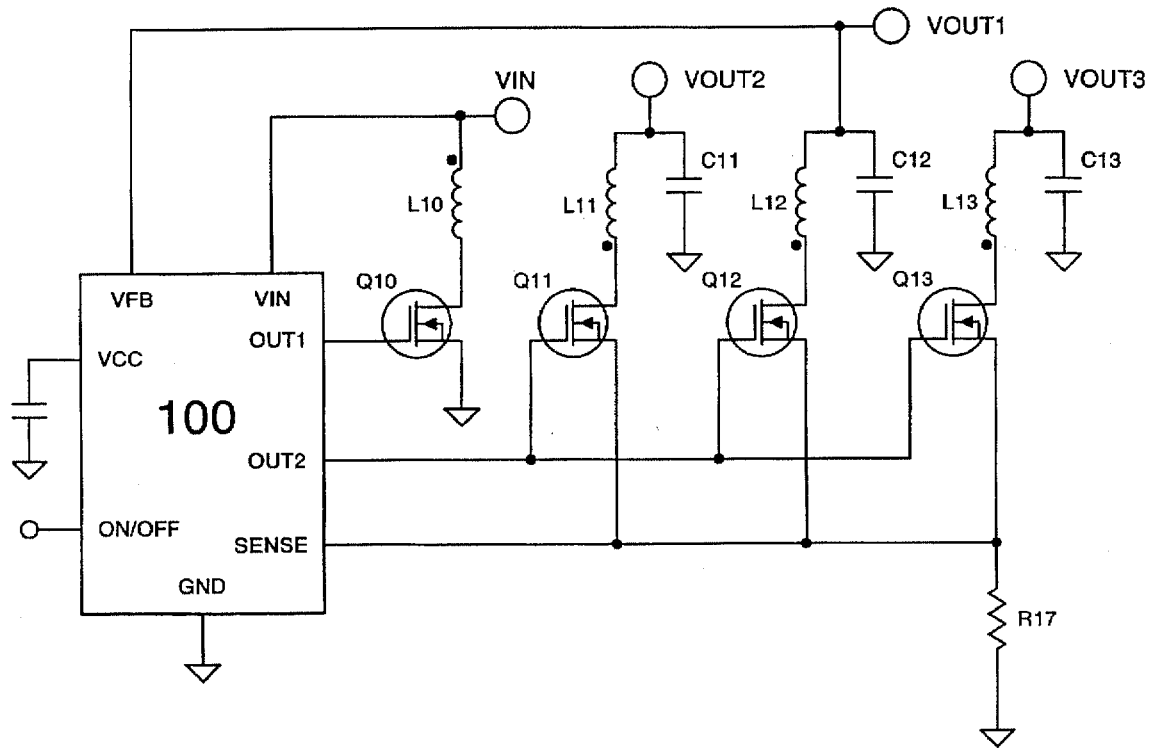
FIG. 7 shows a schematic diagram of an embodiment of the present invention having a simplified resistive network for generating the inductor current feedback voltage signal SENSE, and the output voltage feedback signal VFB.

FIG. 7 shows an alternate embodiment of a network for providing the voltage signal SENSE to the controller. The circuit shown in FIG. 7 is the same as the circuit shown in FIG. 2 except that; the sources of Q11, Q12 and Q13 are coupled to a first terminal of a resistor R17 and coupled to provide the signal SENSE to the controller 100; and a second terminal of the resistor R17 is coupled to the ground node.

The above described circuit does not include the conductor which couples the controller to the first terminal of the resistor R11, nor does it include the resistors R11, R12 or R13 as shown in FIG. 2. The circuit shown in FIG. 7 has an advantage over the circuit shown in FIG. 2 in that only one inductor current sense resistor is required. A disadvantage of the circuit shown in FIG. 7 is that the single sense resistor R17 must be valued for the highest output voltage, and the lower voltage outputs will force the circuit into current limit prematurely (at least so far as transformer saturation is concerned).

Figure 8:
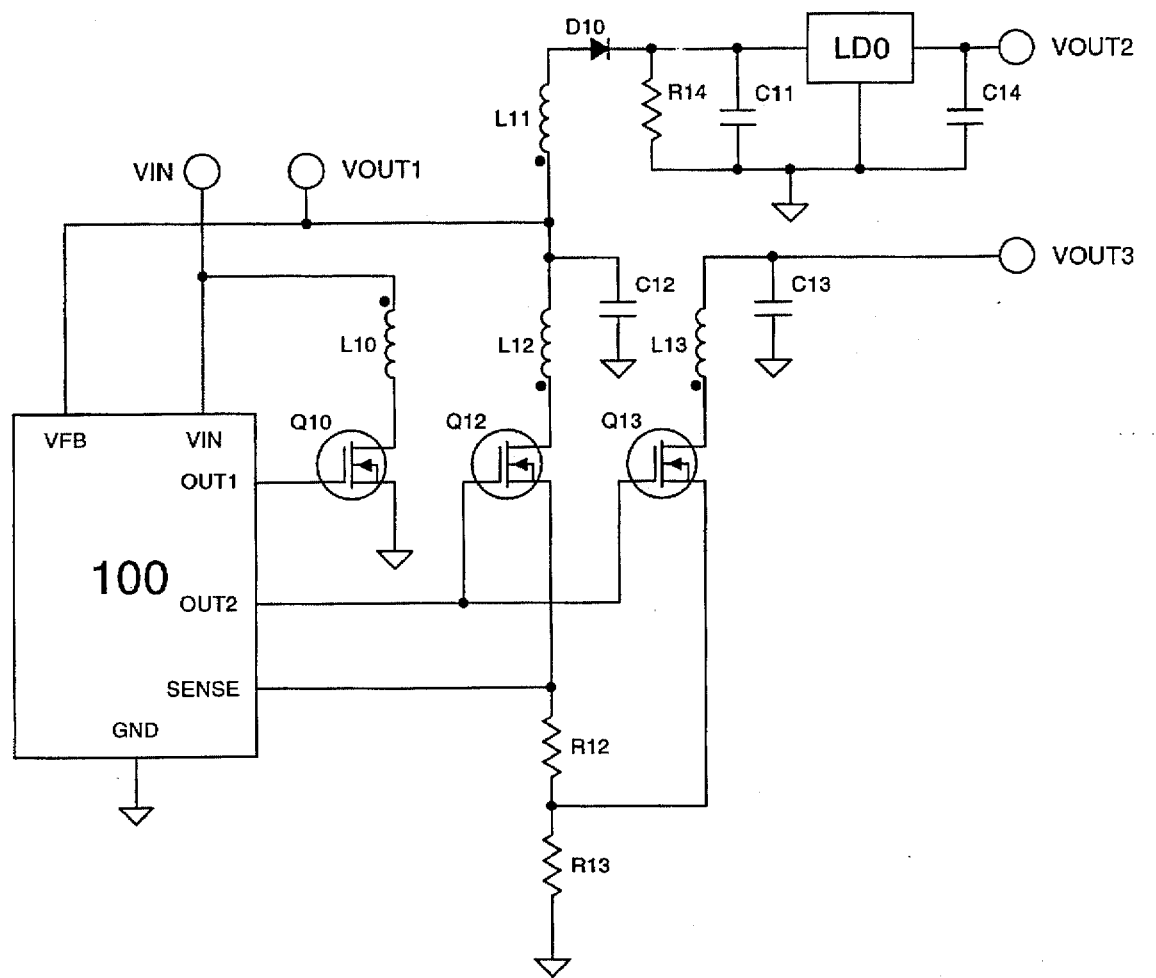
FIG. 8 shows a schematic diagram of an alternate embodiment of the present invention employing a mixture of prior art elements and elements of the preferred embodiment.

FIG. 8 shows an alternate embodiment of the present invention. The circuit shown in FIG. 8 may be compared to the circuit shown in FIG. 2 except that the first terminal of the winding L11 is coupled to the second terminal of the winding L12; Q11 is eliminated; R11 is shorted; an anode of a diode D10 is coupled to the second terminal of the winding L11; a cathode of the diode D10 is coupled to a first terminal of a resistor R14, to the first terminal of C11 and to an input to a low drop out regulator LDO; a second terminal of the resistor R14 is coupled to the ground node; the second terminal of the capacitor C11 is coupled to the ground node; a ground terminal of the low drop out regulator LDO is coupled to the ground node; an output terminal of the low drop out regulator LDO is coupled to a first terminal of a capacitor C14 and to the output voltage node VOUT2; a second terminal of the capacitor C14 is coupled to the ground node.

Figure 1:
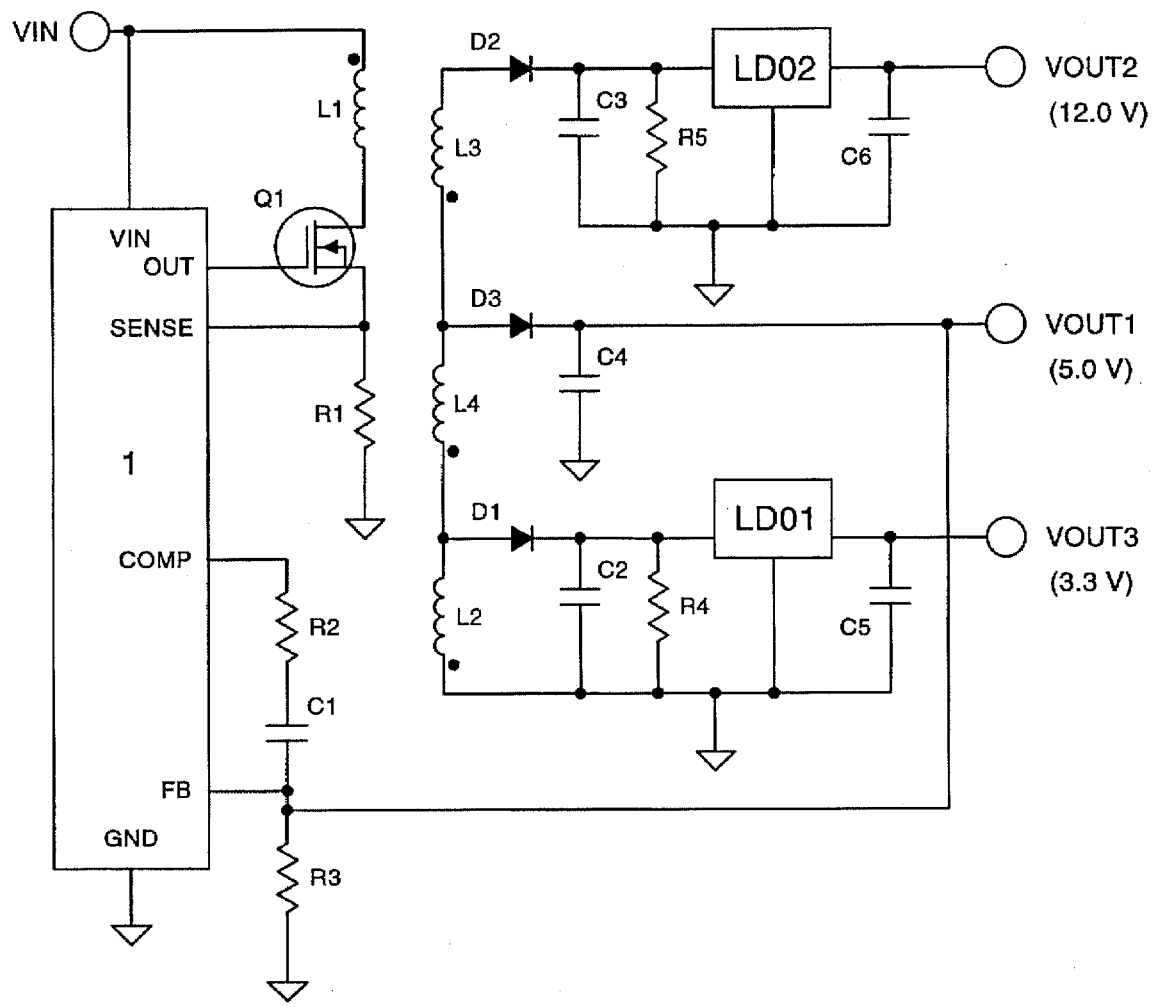
FIG. 1 shows a schematic diagram of a prior art DC-to-DC converter.

VOUT2 has better regulation because of the LDO, but at the expense of lower efficiency and higher complexity. Also, the current in L11 is not properly represented in the current-sense network, R12, and R13. However, certain cost and performance specifications may make such a circuit more desirable. The voltage feedback signal VFB is taken from the output node VOUT1, which is the 5.0 volt output, because this voltage generally is required to have a fighter tolerance than the 12.0 volt output (VOUT2) or the 3.3 volt output (VOUT3). If VOUT2 is lightly loaded, the low drop out regulator LDO and a minimum load are required as in the circuit shown in FIG. 1. This circuit shows how elements of the prior art circuit may be combined with elements of the present invention to arrive at a novel circuit which allows a trade-off between cost and performance for the various outputs.

Referring to FIG. 8, VIN is coupled to a first terminal of a primary winding L10 which is designated with a dot and coupled to provide a voltage input VIN to a controller 100. A second terminal of L10 is coupled to a drain of an NMOSFET Q10. A source of Q10 is coupled to the ground node. A gate of Q10 is coupled to the controller 100 to be controlled by a signal OUT1. An output signal OUT2 from the controller is coupled to a gate of an NMOSFET Q12 and to a gate of an NMOSFET Q13. A source of the NMOSFET Q12 is coupled to a first terminal of a resistor R12 and coupled to deliver a voltage signal SENSE to the controller 100.

A second terminal of the resistor R12 is coupled to a first terminal of a resistor R13 and to a source of Q13. A second terminal of the resistor R13 is coupled to the ground node. A drain of Q12 is coupled to a first terminal of a secondary winding L12 which is designated with a dot. A second terminal of L12 is coupled to a first terminal of a secondary winding L11 which is designated with a dot, to a first terminal of a capacitor C12, to an output voltage node VOUT1 and coupled to provide a feedback voltage signal VFB to the controller 100. A second terminal of the capacitor C12 is coupled to the ground node.

A second terminal of the winding L11 is coupled to an anode of a diode D10. A cathode of the diode D10 is coupled to a first terminal of a resistor R14, to a first terminal of a capacitor C11 and to an input to a low drop out regulator LDO. A second terminal of the resistor R14 is coupled to the ground node. A second terminal of the capacitor C11 is coupled to the ground node. A ground terminal of the low drop out regulator LDO is coupled to the ground node. An output terminal of the low drop out regulator LDO is coupled to a first terminal of a capacitor C14 and to an output voltage node VOUT2. A second terminal of the capacitor C14 is coupled to the ground node. A drain of Q13 is coupled to a first terminal of a secondary winding L13 which is designated with a dot. A second terminal of L13 is coupled to an output voltage node VOUT3 and to a first terminal of a capacitor C13. A second terminal of the capacitor C13 is coupled to the ground node.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. Also, referring to FIG. 3, rather than having both the output of the transconductance amplifier U1 and the signal SENSE coupled to the non-inverting input to the current programming comparator U2, it will be apparent that the signal SENSE could instead be coupled to the inverting input to the current programming comparator U2 if the polarity of the inputs to U1 are reversed. Further, by applying the teachings of this disclosure, especially with reference to FIG. 6 and FIG. 7, it will be apparent to a person skilled in the art that a DC-to-DC converter could be constructed having any number of outputs by adding additional secondary windings, output capacitors and rectifying elements as needed. In addition, it will be apparent that the secondary windings may be either a single winding with multiple taps or individual, isolated windings.

What is claimed is:

1. A DC-to-DC converter comprising a converter controller wherein the converter controller comprises:

a. a circuit for forming a difference signal wherein the difference signal is proportional to a difference between a first reference voltage and a voltage representative of a first converter output voltage;
   b. a first comparator for forming a first control signal coupled to compare a voltage representative of the difference signal to a voltage representative of a first secondary current wherein the first secondary current passes through a first secondary winding and further wherein the first secondary winding is inductively coupled to a primary winding for forming the first converter output voltage by the first secondary current charging a first output capacitor and wherein the first secondary current is rectified by a first rectifying element;
   c. a constant on-time, minimum off-time oscillator for controlling means for controlling a current through the primary winding wherein the constant on-time, minimum off-time oscillator is coupled to be controlled by the first control signal;
   d. a circuit for forming a second converter output voltage comprising a second secondary winding inductively coupled to the primary winding wherein the second converter output voltage is formed by a second secondary current passing through the second secondary winding charging a second output capacitor and wherein the second secondary current is rectified by a second rectifying element; and
   e. a synchronous rectifier controller comprising a second comparator for forming a second control signal coupled to compare the voltage representative of the first secondary current to a second reference voltage and a gate driver for forming a drive signal coupled to receive the second control signal wherein the drive signal is coupled to control the first rectifying element and the second rectifying element.

2. The DC-to-DC converter as claimed in claim 1 wherein the voltage representative of the difference signal may be positive or negative and the voltage representative of the first secondary current may only be negative and further wherein the first comparator activates the constant on-time, minimum off-time oscillator when the addition of the voltage representative of the difference signal to the voltage representative of the first secondary current results in a value greater than a third reference voltage and wherein the first comparator deactivates the constant on-time, minimum off-time oscillator when the addition of the voltage representative of the difference signal to the voltage representative of the first secondary current results in a value greater than the third reference voltage and wherein the first comparator deactivates the constant on-time, minimum off-time oscillator when the addition of the voltage representative of the difference signal to the voltage representative of the first secondary current results in a value less than the third reference voltage.

3. The DC-to-DC converter according to claim 1 wherein the circuit for forming the difference signal comprises a transconductance amplifier.

4. The DC-to-DC converter according to claim 1 wherein the means for controlling the current through the primary winding comprises a transistor coupled in series with the primary winding.

5. The DC-to-DC converter according to claim 1 wherein the voltage representative of the first secondary current is formed by the current through the first secondary winding passing through a resistor.

6. The DC-to-DC converter according to claim 1 wherein the voltage representative of the first converter output voltage is the first converter output voltage.

7. The DC-to-DC converter according to claim 1 wherein the voltage representative of the first converter output voltage is also representative of the second converter output voltage.

8. The DC-to-DC converter according to claim 1 wherein the first rectifying element is a first transistor coupled in series with the first secondary winding and the second rectifying element is a second transistor coupled in series with the second secondary winding and wherein current may pass in either direction through the first transistor and the second transistor whereby the first converter output voltage and the second converter output voltage are cross-regulated.

9. The DC-to-DC converter according to claim 8 further comprising a third secondary winding inductively coupled to the primary winding wherein a third output voltage is generated by a third secondary current passing through the third secondary winding charging a third output capacitor and further wherein the third secondary current is rectified by a third rectifying element comprising a third transistor coupled in series with the third secondary winding and further wherein current may pass in either direction through the third transistor whereby the first converter output voltage, the second converter output voltage and the third converter output voltage are cross-regulated.

10. The DC-to-DC converter according to claim 9, wherein the voltage representative of the first secondary current is formed by a resistive network wherein a level of the voltage representative of the first secondary current is also representative of the second secondary current and the third secondary current.

11. The DC-to-DC converter according to claim 9 wherein the voltage representative of the first converter output voltage is a weighted average of the first converter output voltage, the second converter output voltage and the third converter output voltage.

12. The DC-to-DC converter according to claim 9 wherein the voltage representative of the first converter output voltage is the greater of a difference between the first converter output voltage and a first desired value, a difference between the second converter output voltage and a second desired value and a difference between the third converter output voltage and a third desired value.

13. A DC-to-DC converter comprising a converter controller wherein the converter controller comprises:
   a. a comparator for comparing a difference signal to a inductor current signal for forming a first control signal wherein the difference signal is representative of a difference between a signal representative of a first converter output voltage and a desired output voltage and wherein the inductor current signal is representative of a current through a first secondary winding of a coupled inductor wherein the comparator has a first comparator input coupled to receive a signal representative of an addition of the difference signal to the inductor current signal, a second comparator input coupled to receive a reference voltage and a comparator output for forming the first control signal and wherein the difference signal is formed by a transconductance amplifier having a first transconductor input coupled to receive the signal representative of the first converter output voltage, a second transconductor input coupled to receive the desired output voltage and a transconductor output coupled to a resistor for forming the difference signal;
   b. a constant on-time, minimum off-time oscillator for controlling means for controlling a current through a primary winding of the coupled inductor coupled to receive the first control signal; and
   c. means for synchronously rectifying the current through the first secondary winding coupled to receive the inductor current signal.

14. The DC-to-DC converter according to claim 13 wherein the means for synchronously rectifying comprises a first transistor having a first source, a first drain and a first gate wherein the first drain is coupled to a first terminal of the first secondary winding, the first source is coupled to a resistive network for forming the inductor current signal and the first gate is coupled to be controlled by a synchronous rectifier controller.

15. The DC-to-DC converter according to claim 14 wherein the synchronous rectifier controller comprises:
   a. a comparator for forming a second control signal coupled to compare the inductor current signal to a reference voltage; and
   b. a gate driver coupled to receive the second control signal and coupled to control the first gate.

16. The DC-to-DC converter according to claim 15 wherein the synchronous rectifier controller further comprises a blanking circuit for forming a blanking signal coupled between the comparator and the gate driver wherein the blanking circuit receives the second signal and the blanking circuit receives a minimum off-time signal formed by the constant on-time, minimum off-time oscillator and wherein the gate driver receives a blanking signal formed by the blanking circuit.

17. The DC-to-DC converter according to claim 13 wherein the first output voltage is generated by the current through the first secondary winding charging a first output capacitor.

18. The DC-to-DC converter according to claim 17 wherein a second output voltage is generated by a second secondary current through a second secondary winding charging a second output capacitor and wherein the inductor current signal is also representative of the second secondary current.

19. The DC-to-DC converter according to claim 18 wherein the means for synchronously rectifying comprises:
   a. a first transistor having a first source, a first drain and a first gate wherein the first drain is coupled to a first terminal of the first secondary winding, the first source is coupled to a resistive network for forming the inductor current signal and the first gate is coupled to be controlled by a synchronous rectifier controller; and
   b. a second transistor having a second source, a second drain and a second gate wherein the second drain is coupled to a first terminal of the second secondary winding, the second source is coupled to the resistive network and the second gate is coupled to be controlled by the synchronous rectifier controller.

20. The DC-to-DC converter according to claim 19 wherein the synchronous rectifier controller comprises:
   a. a comparator for forming a second control signal coupled to compare the inductor current signal to a reference voltage; and
   b. a gate driver coupled to receive the second control signal and coupled to control the first gate and the second gate.

21. The DC-to-DC converter according to claim 20 wherein the synchronous rectifier controller further comprises a blanking circuit for forming a blanking signal coupled between the comparator and the gate driver wherein the blanking circuit receives the second signal and the blanking circuit receives a miniram off-time signal formed by the constant on-time, minimum off-time oscillator and wherein the gate driver receives a blanking signal formed by the blanking circuit.

22. The DC-to-DC converter according to claim 20 wherein the synchronous rectifier controller further comprises a blanking circuit for forming a blanking signal coupled between the comparator and the gate driver wherein the blanking circuit receives the second signal and the gate driver receives the blanking signal.

23. The DC-to-DC converter according to claim 20 wherein current may pass from the source to the drain and from the drain to source of each of the first and second transistors whereby the first converter output voltage and the second converter output voltage are cross-regulated.

24. The DC-to-DC converter according to claim 23 wherein a third output voltage is generated by a third secondary current through a third secondary winding charging a third output capacitor and wherein the inductor current signal is also representative of the third secondary current and farther wherein the means for synchronously rectifying comprises a third transistor having a third source, a third drain and a third gate wherein the third drain is coupled to a first terminal of the third secondary winding, the third source is coupled to the resistive network and the third gate is coupled to be controlled by the synchronous rectifier controller and further wherein current may pass from the source to the drain and from the drain to the source of the third transistor whereby the first converter output voltage, the second converter output voltage, and the third converter output voltage are cross-regulated.

25. A DC-to-DC converter comprising:
   a. a transconductance amplifier having a transconductor inverting input, a transconductor non-inverting input and a transconductor output, wherein the transconductor non-inverting input is coupled to a first reference voltage;
   b. a comparator having a comparator non-inverting input, a comparator inverting input and a comparator output, wherein the comparator non-inverting input is coupled to the transconductor output and to a first terminal of a resistor, and further wherein the comparator inverting input is coupled to a second reference voltage;
   c. a constant on-time oscillator having an oscillator input and an oscillator output wherein the oscillator input is coupled to the first comparator output wherein the oscillator input suspends the operation of the oscillator at the end of an off-time when low;
   d. a first transistor having a first gate, a first source and a first drain, wherein the first gate is coupled to the oscillator output and the first source is coupled to a ground node;
   e. a first inductor inductively coupled to a second inductor, a third inductor and a fourth inductor, wherein a first terminal of the first inductor is coupled to the first drain and a second terminal of the first inductor is coupled to a voltage source;
   f. a synchronous rectifier controller having a synchronous rectifier input and a synchronous rectifier output wherein the synchronous rectifier input is coupled to a second terminal of the resistor;
   g. a resistive network having a resistive network first input, a resistive network second input, a resistive network third input and a resistive network output wherein the resistive network output is coupled to the synchronous rectifier input;
   h. a second transistor having a second gate, a second drain and a second source wherein the second gate is coupled to the synchronous rectifier output, the second source is coupled to the resistive network first input and the second drain is coupled to a first terminal of the second inductor;
   i. a third transistor having a third gate, a third drain and a third source wherein the third gate is coupled to the synchronous rectifier output, the third source is coupled to the resistive network second input and the third drain is coupled to a first terminal of the third inductor;
   j. a fourth transistor having a fourth gate, a fourth drain and a fourth source wherein the fourth gate is coupled to the synchronous rectifier output, the fourth source is coupled to the resistive network third input and the fourth drain is coupled to a first terminal of the fourth inductor;
   k. a first capacitor wherein a first terminal of the first capacitor is coupled to a second terminal of the second inductor and a second terminal of the first capacitor is coupled to the ground node;
   l. a second capacitor wherein a first terminal of the second capacitor is coupled to a second terminal of the third inductor and to the transconductor inverting input and a second terminal of the second capacitor is coupled to the ground node; and
   m. a third capacitor wherein a first terminal of the third capacitor is coupled to a second terminal of the fourth inductor and the second terminal of the third capacitor is coupled to the ground node.

26. A multiple output DC-to-DC converter comprising:
   a. a magnetic circuit having a primary winding and at least two output windings wherein each output winding has a turns ratio relative to a number of turns of the primary winding; and
   b. a switching network having a first switched phase and a second switched phase, wherein energy is added to the magnetic circuit from a voltage source in the first switched phase, and energy is drained from the magnetic circuit into storage capacitors in the second switched phase, one storage capacitor coupled to each output winding wherein the switching network allows bi-directional current flow in the second switched phase for equalizing output voltages according to turns ratios.

27. The DC-to-DC converter according to claim 26 wherein the switched network comprises one transistor coupled to each secondary winding wherein each transistor is bi-directionally conductive during the second switched phase.

28. A DC-to-DC converter comprising a converter controller wherein the converter controller comprises:
   a. a first circuit for forming a signal representative of a first converter output voltage wherein the first converter output voltage is formed by a current in a first secondary winding charging a first capacitor and wherein a second converter output voltage is formed by a current in a second secondary winding charging a second capacitor wherein the first secondary winding and the second secondary winding are magnetically coupled to a primary winding;
   b. a second circuit for forming a signal representative of a current in the first secondary winding;
   c. means for controlling a current in the primary winding wherein the current in the primary winding has a constant on-time and an off-time that is determined based upon a comparison of the signal representative of the first converter output voltage to the signal representative of the current in the first secondary winding; and d. means for cross-regulating the first output voltage and the second output voltage.

29. The DC-to-DC converter according to claim 28 wherein the signal representative of the first converter output voltage is also representative of the second converter output voltage.

30. The DC-to-DC converter according to claim 28 wherein the signal representative of the current in the first secondary winding is also representative of the current in the second secondary winding.

31. The DC-to-DC converter according to claim 28 wherein the means for cross-regulating allows bi-directional current flow between the first capacitor and the second capacitor.

32. The DC-to-DC converter according to claim 29 wherein the means for cross-regulating synchronously rectifies the current in the first secondary winding and the current in the second secondary winding.

* * * * *

UNITED STATES PATENT AND TRADEMARK OFFICE
CERTIFICATE OF CORRECTION

PATENT NO. : 5,663,874
DATED : September 2, 1997
INVENTOR(S) : Mader, et al

It is certified that error appears in the above-identified patent and that said Letters Patent is hereby corrected as shown below:

In the entire specification, delete "18 mV" and insert --18mV--.

In column 4, line 4, delete "current fails below" and insert --current falls below--.

In column 4, line 48, delete "mount of supply current dram during" and insert --amount of supply current drawn during --.

In column 5, line 1, delete "shows a graphs of signal waveforms" and insert --shows graphs of signal waveforms--.

In column 8, line 4, delete "Therefore; the" and insert --Therefore, the--.

In column 8, line 19, delete "is mined on," and insert --is turned on,--.

In column 8, line 28, delete "is mined on" and insert --is turned on--.

In column 8, line 53, delete "secondary whig" and insert --secondary winding--.

In column 10, line 41, delete "change states CISW) so" and insert --change states (ISW) so--.

In column 10, line 43, delete "Q10 is off," and insert --Q10 is off.--.

In column 11, line 48, delete "described feedbrick" and insert --described feedback--.

In column 12, line 51, delete "have a fighter" and insert --have a tighter--.

UNITED STATES PATENT AND TRADEMARK OFFICE
CERTIFICATE OF CORRECTION

PATENT NO. : 5,663,874
DATED : September 2, 1997
INVENTOR(S) : Mader, et al

It is certified that error appears in the above-identified patent and that said Letters Patent is hereby corrected as shown below:

IN THE CLAIMS

In column 14, line 49, delete "greater than the" and insert --greater than a--.

In column 17, line 19, delete "and farther" and insert --and further--.

In column 18, line 32, delete "a rams ration" and insert --a turns ratio--.

Signed and Sealed this

Third Day of March, 1998

Attest:

BRUCE LEHMAN

*Attesting Officer*   *Commissioner of Patents and Trademarks*